United States Patent
Camhi

(10) Patent No.: US 7,978,217 B2
(45) Date of Patent: Jul. 12, 2011

(54) SYSTEM FOR PROMOTING PHYSICAL ACTIVITY EMPLOYING IMPACT POSITION SENSING AND RESPONSE

(75) Inventor: Keith Camhi, Stamford, CT (US)

(73) Assignee: Great Play Holdings LLC, Stamford, CT (US)

( * ) Notice: Subject to any disclaimer, the term of this patent is extended or adjusted under 35 U.S.C. 154(b) by 1070 days.

(21) Appl. No.: 11/341,692

(22) Filed: Jan. 27, 2006

(65) Prior Publication Data

US 2007/0177024 A1  Aug. 2, 2007

(51) Int. Cl.
*H04N 7/18* (2006.01)

(52) U.S. Cl. .................. 348/157; 348/169

(58) Field of Classification Search .......... None
See application file for complete search history.

(56) References Cited

U.S. PATENT DOCUMENTS

| | | | |
|---|---|---|---|
| 3,091,466 A | 5/1963 | Speiser | 273/184 |
| 3,508,440 A | 4/1970 | Murphy | 73/379 |
| 3,598,976 A | 8/1971 | Russell | 235/151 |
| 4,086,630 A | 4/1978 | Speiser et al. | 364/410 |
| 4,160,942 A * | 7/1979 | Lynch et al. | 359/443 |
| 4,751,642 A | 6/1988 | Silva et al. | 364/413 |
| 4,767,121 A | 8/1988 | Tonner | 273/185 |
| 4,915,384 A | 4/1990 | Bear | 273/26 R |
| 5,443,260 A | 8/1995 | Stewart et al. | 273/26 R |
| 5,768,151 A | 6/1998 | Lowy et al. | 364/550 |
| 6,911,995 B2 * | 6/2005 | Ivanov et al. | 348/42 |
| 2002/0094893 A1 * | 7/2002 | Takowski | 473/570 |
| 2004/0116183 A1 * | 6/2004 | Prindle | 463/42 |
| 2005/0261071 A1 * | 11/2005 | Cameron | 473/219 |
| 2007/0072159 A1 * | 3/2007 | Olson | 434/252 |
| 2008/0129704 A1 * | 6/2008 | Pryor | 345/173 |
| 2008/0132332 A1 * | 6/2008 | Pryor | 463/31 |

OTHER PUBLICATIONS

Mueller et al., "Sports Over a Distance," ACM Computers in Entertainment, vol. 3, No. 3, Jul. 2005.*
"GameSpot Presents: A Brief Timeline of Video Game Music," internet webpage, dated to May 23, 2001 via the Wayback Machine at archive.org.*
"Exertion Interfaces: Technical Details: Ball Detection," internet webpage dated to Jun. 12, 2003 via the Wayback Machine at archive.org.*
Maynes-Aminzade et al., "Techniques for Interactive Audience Participation," ICMI, 2002.*

* cited by examiner

*Primary Examiner* — Nhan T Tran
*Assistant Examiner* — Dennis Hogue
(74) *Attorney, Agent, or Firm* — St. Onge Steward Johnston & Reens, LLC

(57) ABSTRACT

A system for promoting physical activity includes at least two cameras which capture images of an object and generate image signals indicative of the captured images. A processor in communication with the cameras receives the image signals from the cameras and determines, based at least on part upon the image signals, when and in what position the object impacts a surface. The processor generates, based at least in part upon the determination of when and in what position the object impacts the surface, feedback signals indicative of feedback to be provided to a user of the system. A projector in communication with the processor receives the feedback signals and, based at least in part upon the feedback signals, displaying visual feedback to the user on the surface.

19 Claims, 3 Drawing Sheets

SYSTEM FOR PROMOTING PHYSICAL ACTIVITY EMPLOYING IMPACT POSITION SENSING AND RESPONSE

FIELD OF THE INVENTION

The present invention relates generally to a system for promoting physical activity, and more specifically to a system that determines the position and the time at which an object, such as a ball, impacts a surface and generates an appropriate response based upon the determined position and time of impact.

BACKGROUND OF THE INVENTION

Motor skills and sport skills are learned by frequent repetition of proper technique. Many people have trouble reaching their full physical potential because either they are not taught proper technique (unlearning "wrong" technique is a challenge), or they become bored with the repetition (practice) process that is required to master the technique, sometimes referred to as burning the technique into "muscle memory."

In addition, overall participation in physical activity has been declining in the population. This creates a wide range of individual and societal concerns—from obesity to adult-onset diabetes in children. Children are increasingly involved in technology-enabled "screen time"—including watching television and playing computer games. Screen time is often excessive for children because it is so engaging. This contributes to a sedentary lifestyle.

In order to reverse this decline in physical activity within the population, particularly among children, it is desired to provide a system (1) to aid participants in learning and mastering motor skills, and (2) to apply the engaging elements of technology for the positive purpose of promoting physical activity. More specifically, it is desired to promote repetition (and practice) with ongoing, immediate, and engaging feedback.

Various systems have been developed which aim to achieve these goals by providing a simulated sports environment, such as, in particular, by simulating various aspects of baseball (e.g., simulated hitting and pitching systems) and golf.

The trajectory of the struck ball is determined in some golf simulators by measuring parameters of the ball's impact with a surface. In these golf simulation systems, the essential element is a contact surface which allows a system to capture data at the moment of impact. Such a surface usually is equipped with electromechanical or photocell sensors. When a surface impacts with a ball, data captured by the sensors is connected to electrical circuits for analysis. Examples are U.S. Pat. Nos. 4,767,121, 4,086,630, 3,598,976, 3,508,440 and 3,091,466.

However, the electromechanical nature of a contact surface makes it prone to failure and to miscalibration. Frequent physical impacts on the surface tend to damage the sensors, and failure or miscalibration of a single sensor in an array of sensors covering the surface can seriously degrade system accuracy. Abnormalities in a stretched contact surface, such as those produced by high speed impacts, also can produce results that are misleading. Furthermore, the applications of an impact sensing system are limited. Limitations include the requirement to fix the source of the ball at a predetermined distance, limited target area, and insensitivity to soft impacts.

Another trajectory determination technique used in golf simulators is based on microphones sensing the sounds of both a club-to-ball contact and a surface-to-ball contact. With this technique, microphones are placed in four or more locations around the surface so that their combined inputs can measure the point at which the ball surface is hit. Based on the speed of sound, the relative timing of audio events at each microphone provide enough data to allow a computer to derive ball speed and trajectory. This approach may be less prone to electromechanical failure, but it still has its limitations. The limitations of an audio system include the need for at least three channels (having four is preferred), relative insensitivity to soft (low speed) impacts and no ability at all to be used when an object is not struck (e.g., there is substantially no sound created when an object is thrown), and sensitivity to other noise sources.

Some golf simulators also calculate ball spin by reflecting a laser beam off a mirror located on a special golf ball designed specifically for that purpose. The ball must be placed in a particular position prior to being hit with the mirror facing a laser and receiver array. The laser beam's reflection is sensed by a receiver array, and on impact, the motion of the beam is used to determine ball spin. This technology provides data which augments the basic data of speed and trajectory. However, it also requires the use of a special ball and additional equipment.

In another, more recently developed type of system, which is disclosed in U.S. Pat. No. 5,768,151, a computerized system determines the trajectory of an object based upon video images captured by cameras at two fixed viewpoints. Two video cameras are arranged so that each will contain the anticipated trajectory of an object within its field of view. The video cameras are synchronized and have shutter speeds slow enough to yield an image of the object containing a blur due to the object's motion. An audio or an optical trigger, derived either from the event causing object motion or from the object itself, causes at least two images to be captured in digital frame buffers in a computer. Software in the computer accesses each of the digital frame buffers and subtracts the background image to isolate the blurred object. A two-dimensional projection of the object's trajectory is derived for each frame buffer image. The two dimensional trajectories are combined to determine a three dimensional trajectory.

While each of the above-described systems may provide an accurate sports simulation to some degree, they are generally more concerned with providing a highly accurate measurement of the velocity, direction, spin, etc. of a thrown or hit ball than they are with providing an environment that will engage participants, particularly children, for frequent repetitions of an activity. This deficiency of the prior art systems leads to two major disadvantages associated therewith: (1) the systems do not effectively promote long term physical activity, particularly among children, and (2) the systems are relatively complex, and therefore costly to produce and maintain, and are prone to failure.

What is desired, therefore, is a system for promoting physical activity which aids participants in learning and mastering motor skills, which promotes repetition with ongoing, immediate, and engaging feedback, which is relatively not costly to produce and maintain, which accurately senses the impact of an object with a surface, which is not prone to failure and/or miscalibration, and which can be used in situations where an object being tracked is not struck with a bat, club, etc.

SUMMARY OF THE INVENTION

Accordingly, it is an object of the present invention to provide a system for promoting physical activity which aids participants in learning and mastering motor skills.

Another object of the present invention is to provide a system for promoting physical activity having the above characteristics and which promotes repetition with ongoing, immediate, and engaging feedback.

A further object of the present invention is to provide a system for promoting physical activity having the above characteristics and which is relatively not costly to produce and maintain.

Still another object of the present invention is to provide a system for promoting physical activity having the above characteristics and which accurately senses the impact of an object with a surface.

Yet a further object of the present invention is to provide a system for promoting physical activity having the above characteristics and which is not prone to failure and/or miscalibration.

Still a further object of the present invention is to provide a system for promoting physical activity having the above characteristics and which can be used in situations where an object being tracked is not struck with a bat, club, etc.

These and other objects are achieved in accordance with one embodiment of the present invention by provision of a system for promoting physical activity including at least two cameras which capture images of an object and generate image signals indicative of the captured images. A processor in communication with the cameras receives the image signals from the cameras and determines, based at least on part upon the image signals, when and in what position the object impacts a surface. The processor generates, based at least in part upon the determination of when and in what position the object impacts the surface, feedback signals indicative of feedback to be provided to a user of the system. A projector in communication with the processor receives the feedback signals and, based at least in part upon the feedback signals, displays visual feedback to the user on the surface.

In some embodiments, at least one of the at least two cameras comprises a side view camera positioned with a viewing axis thereof substantially parallel to the surface, the side view camera capturing images illustrative of when the object impacts the surface. In certain of these embodiments, at least one of the at least two cameras comprises a rear view camera capturing images illustrative of where on the surface the object impacts. In some embodiments, the at least two cameras comprises at least three cameras, and two of the cameras comprise side view cameras positioned with viewing axes thereof substantially parallel to the surface, the side view cameras capturing images illustrative of when the object impacts the surface. In certain of these embodiments, at least one of the at least three cameras comprises a rear view camera capturing images illustrative of where on the surface the object impacts.

In some embodiments, the at least two cameras comprise at least two rear view cameras positioned with viewing axes thereof arranged at oblique angles with respect to the surface, the rear view cameras capturing images of the object as it approaches and impacts the surface. In certain of these embodiments, the processor determines when and in what position the object impacts the surface based at least in part upon a relationship between the images captured by the rear view cameras. In certain of these embodiments, the processor determines that the object has impacted the surface when the object is positioned in substantially identical locations within images captured by the rear view cameras at any given time.

In some embodiments, the system further includes a speaker in communication with the processor, the speaker receiving the feedback signals and, based at least in part upon the feedback signals, playing audio feedback to the user. In some embodiments, the projector generates and displays visual cues on the surface which encourage the user to throw the object toward particular areas of the surface.

In accordance with another aspect of the invention, a system for promoting physical activity includes a side view camera which captures images of an object and generates image signals indicative of the captured images, the side view camera positioned with a viewing axis thereof substantially parallel to a surface, and capturing images illustrative of when the object impacts the surface. The system also includes a rear view camera which captures images of an object and generates image signals indicative of the captured images, the rear view camera capturing images illustrative of where on the surface the object impacts. A processor in communication with the side view camera and the rear view camera receives the image signals from the side view camera and the rear view camera and determines, based at least on part upon the image signals, when and in what position the object impacts the surface.

In some embodiments, the processor generates, based at least in part upon the determination of when and in what position the object impacts the surface, feedback signals indicative of feedback to be provided to a user of the system. In certain of these embodiments, the system further includes a projector in communication with the processor, the projector receiving the feedback signals and, based at least in part upon the feedback signals, displaying visual feedback to the user on the surface. In some embodiments, the system further includes a speaker in communication with the processor, the speaker receiving the feedback signals and, based at least in part upon the feedback signals, playing audio feedback to the user.

In some embodiments, the side view camera comprises two side view cameras which capture images of the object and generate image signals indicative of the captured images, the side view cameras positioned with viewing axes thereof substantially parallel to the surface, and capturing images illustrative of when the object impacts the surface. In some embodiments, the system further includes a projector in communication with the processor, the projector generating and displaying visual cues on the surface which encourage the user to throw the object toward particular areas of the surface.

In accordance with a further aspect of the invention, a system for promoting physical activity includes at least two rear view cameras positioned with viewing axes thereof arranged at oblique angles with respect to a surface, the rear view cameras capturing images of an object as it approaches and impacts the surface and generating image signals indicative of the captured images. A processor in communication with the rear view cameras receives the image signals from the rear view cameras and determines when and in what position the object impacts the surface based at least in part upon a relationship between the images captured by the rear view cameras.

In some embodiments, the processor determines that the object has impacted the surface when the object is positioned in substantially identical locations within images captured by the rear view cameras at any given time. In some embodiments, the processor generates, based at least in part upon the determination of when and in what position the object impacts the surface, feedback signals indicative of feedback to be provided to a user of the system. In certain of these embodiments, the system further includes a projector in communication with the processor, the projector receiving the feedback signals and, based at least in part upon the feedback signals, displaying visual feedback to the user on the surface. In certain embodiments, the system further includes a speaker in communication with the processor, the speaker receiving the feedback signals and, based at least in part upon the feedback signals, playing audio feedback to the user. In some embodiments, the projector generates and displays visual cues on the surface which encourage the user to throw the object toward particular areas of the surface.

In accordance with another aspect of the invention, a system for promoting physical activity includes a plurality of surfaces and a plurality of processors, each of the plurality of processors being associated with one of the plurality of surfaces, and each of the plurality of processors receiving input signals from a plurality of sensors and determining, based at least on part upon the input signals, when and in what position an object impacts one of the plurality of surfaces. The processor generates, based at least in part upon the determination of when and in what position the object impacts one of the plurality of surfaces, feedback signals indicative of feedback to be provided to a user of the system. The system also includes a plurality of projectors, each of the plurality of projectors being in communication with one of the plurality of processors, the plurality of projectors receiving the feedback signals and, based at least in part upon the feedback signals, displaying visual feedback to the user on the plurality of surfaces.

In some embodiments, the system further includes a central controller in communication with the plurality of processors, the central controller causing the plurality of processors to work cooperatively. In some embodiments, the plurality of sensors comprise at least two cameras which capture images of the object, and the input signals comprise image signals generated by the cameras indicative of the captured images. In certain of these embodiments, at least one of the at least two cameras comprises a side view camera positioned with a viewing axis thereof substantially parallel to the surface with which it is associated, the side view camera capturing images illustrative of when the object impacts the surface with which it is associated. In certain of these embodiments, at least one of the at least two cameras comprises a rear view camera capturing images illustrative of where on the surface with which it is associated the object impacts.

In some embodiments, the at least two cameras comprise at least two rear view cameras positioned with viewing axes thereof arranged at oblique angles with respect to the surface with which they are associated, the rear view cameras capturing images of the object as it approaches and impacts the surface with which the rear view cameras are associated. In certain of these embodiments, the processor with which the rear view cameras are associated determines when and in what position the object impacts the surface with which the rear view cameras are associated based at least in part upon a relationship between the images captured by the rear view cameras. In certain of these embodiments, the processor with which the rear view cameras are associated determines that the object has impacted the surface with which the rear view cameras are associated when the object is positioned in substantially identical locations within images captured by the rear view cameras at any given time. In some embodiments, the plurality of projectors generate and display visual cues on the plurality of surfaces which encourage the user to throw the object toward particular areas of the plurality of surfaces.

In accordance with a further aspect of the invention, a system for promoting physical activity includes at least one rear view camera which captures images of an object as it approaches a surface and generates image signals indicative of the captured images, and a processor in communication with the camera. The processor receives the image signals from the camera and determines, based at least on part upon the image signals, when and in what position the object impacts a surface, the processor generating, based at least in part upon the determination of when and in what position the object impacts the surface, feedback signals indicative of feedback to be provided to a user of the system. A projector in communication with the processor receives the feedback signals and, based at least in part upon the feedback signals, displays visual feedback to the user on the surface.

In some embodiments, the images of an object as it approaches the surface are indicative of the object and a shadow of the object on the surface, and the processor determines when and in what position the object impacts the surface at a time when the object and the shadow of the object on the surface converge within the image. In some embodiments, the processor determines when and in what position the object impacts the surface at a time when a vertical path of travel of the object undergoes a dramatic change, thereby indicating that the object has impacted the surface.

The invention and its particular features and advantages will become more apparent from the following detailed description considered with reference to the accompanying drawings.

DETAILED DESCRIPTION OF AN EMBODIMENT OF THE INVENTION

Figure 2:
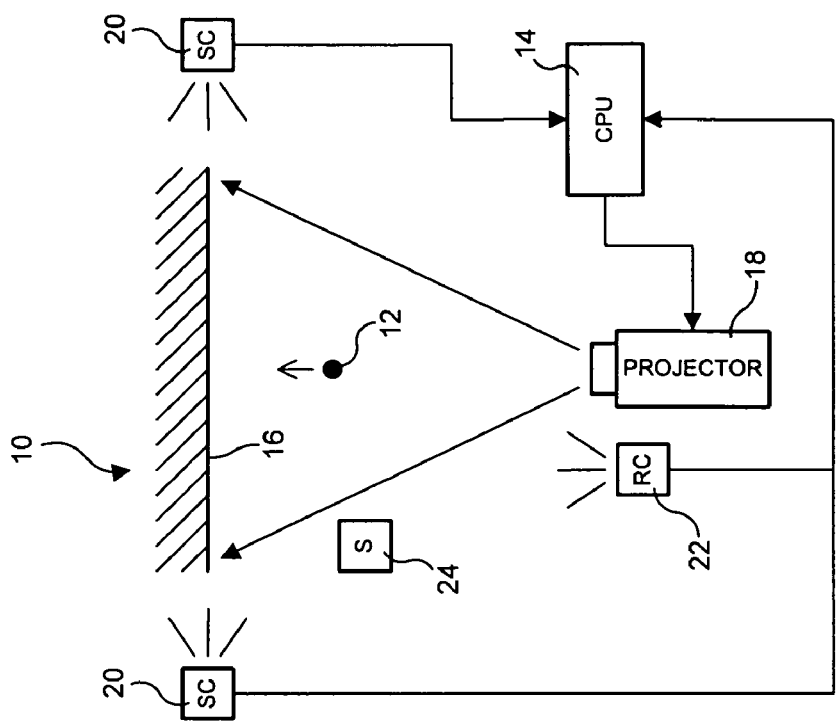
FIG. 2 is a schematic top view of the system for promoting physical activity of FIG. 1.
Figure 1:
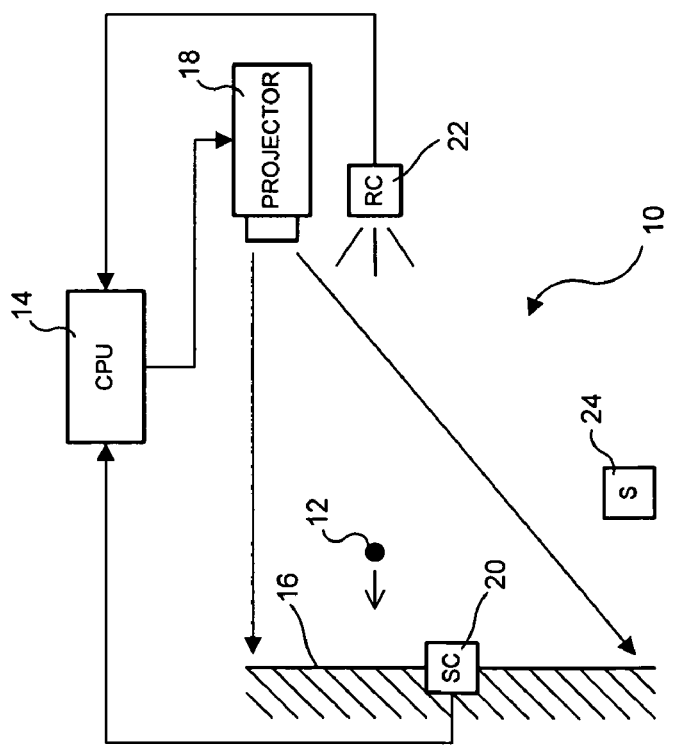
FIG. 1 is a schematic side view of a system for promoting physical activity in accordance with an embodiment of the present invention.

Referring first to FIGS. 1 and 2, a system 10 for promoting physical activity in accordance with an embodiment of the present invention is shown. The system 10 includes at least two cameras which capture images of an object 12 and generate image signals indicative of the captured images. A processor 14 in communication with the cameras receives the image signals from the cameras and determines, based at least on part upon the image signals, when and in what position the object 12 impacts a surface 16. The processor 14 generates, based at least in part upon the determination of when and in what position the object 12 impacts the surface 16, feedback signals indicative of feedback to be provided to a user of the system 10. A projector 18 in communication with the processor 14 receives the feedback signals and, based at least in part upon the feedback signals, displays visual feedback to the user on the surface 16. The projector 18 may also be used to generate and display "targets" or other visual cues which encourage the user to throw the object 12 toward particular areas of the surface 16.

In the embodiment shown in FIGS. 1 and 2, three cameras are shown. Two of the cameras are side view cameras 20 positioned with viewing axes thereof substantially parallel to the surface 16. The side view cameras 20 capture images illustrative of when the object 12 impacts the surface 16. Since the side view cameras 20 are positioned substantially parallel to the surface 16, they are well-adapted to determine when the object 12 impacts the surface 16. However, because of their orientation, it may be difficult to determine precisely where on the surface 16 the object 12 impacts. For this reason, system 10 also includes a rear view camera 22 which captures images illustrative of where on the surface 16 the object 12 impacts.

The rear view camera 22 may be positioned with a viewing axis thereof substantially perpendicular to the surface 16, or it may be positioned with a viewing axis thereof arranged at an oblique angle with respect to the surface 16. In the latter case, since the rear view camera 22 is positioned with a viewing axis thereof arranged at an oblique angle with respect to the surface 16, the camera will "see" a generally quadrilateral or trapezoidal (depending upon the particular placement of the camera) image of the surface 16 with the object 12 being located within this quadrilateral or trapezoidal image as it approaches and contacts the surface 16. The processor has executing thereon an algorithm that calibrates and translates the (u,v) coordinates of the quadrilateral or trapezoidal image captured by camera 22 into standard two-dimensional Cartesian (x,y) coordinates. This may be done by locating the corners and/or edges of the surface 16 and/or by providing calibration markings on the surface 16 and then by using any of the numerous calibrating/translating algorithms that are known in the art for this purpose, or any calibrating/translating algorithms later developed. The calibration process may be performed during a setup interval before the game is played, such that the calibration markings need only be projected during this time. Alternately, the calibration markings may be permanently marked or periodically projected on the surface 16 and calibration may be performed continuously or periodically. Since such algorithms are well-known in the art, they are not described herein in detail.

Thus, the processor employs the image signals received from the side view cameras 20 to determine when the object 12 impacts the surface 16, and employs the image signals received from the rear view camera 22 to determine in what position the object 12 impacts the surface 16. It should be noted that, while the rear view camera 22 may produce image signals tracking the object 12 as it approaches the surface 16, the processor 14 may not be able to readily determine from the image signals received from the rear view camera 22 alone when the object 12 has impacted the surface 16. Similarly, while the side view cameras 20 may produce image signals of the object 12 as it impacts the surface 16, the processor 14 may not be able to readily determine from the image signals received from the side view cameras 20 alone where the object 12 has impacted the surface 16. However, by using the image signals received from the rear view camera 22 in conjunction with the image signals received from the side view cameras 20, the processor 14 can readily determine precisely when and where the object 12 impacts the surface 16.

More specifically, the processor 14 continuously monitors the image signals generated by both the side view cameras 20 and the rear view camera 22. Based upon the image signals generated by the side view cameras 20, the processor 14 "knows" precisely when the object 12 has impacted the surface 16. With this knowledge, the processor 14 also knows precisely which image signals generated by the rear view camera 22 are illustrative of the position of the object 12 at the precise moment it impacts the surface 16. Thus, the processor 14 can use the appropriate image signals generated by the rear view camera 22 to determine the precise position of the object 12 at the time that it impacted the surface 16.

It should be understood that although two side view cameras 20 are shown and described, one or more than two side view cameras may be employed. The number of side view cameras desired, for example, may be dependent upon the how wide of an area each camera is capable of viewing, as well as the size of the surface 16 upon which impacts are to be measured. In some circumstances, providing multiple side view cameras may also allow for the timing of the object 12 impacting the surface 16 to be more precisely determined, particularly when the side view cameras have a relatively low video capture speed and/or when the object 12 strikes the surface 16 at a relatively high velocity. Although the side view cameras 20 in FIGS. 1 and 2 are shown as pointing toward one another in a horizontal plane, it should be recognized that they may be positioned in any of numerous positions (e.g., both pointing horizontally in the same direction, both pointing vertically in the same direction, both pointing vertically toward one another, one pointing horizontally and one pointing vertically, one or both being angled with respect to horizontal or vertical, etc.).

It should also be understood that although one rear view camera 22 is shown and described, more than one rear view camera may also be employed. The number of rear view cameras desired, for example, may be dependent upon the how wide of an area each camera is capable of viewing, the size of the surface 16 upon which impacts are to be evaluated, and how far from the surface 16 the cameras are located. In some circumstances, providing multiple rear view cameras may also allow for the location where of the object 12 impacts the surface 16 to be more precisely determined, particularly when the rear view cameras have a relatively low video capture speed, when the object 12 strikes the surface 16 at a relatively high velocity and/or when the object 12 is traveling at a large angle with respect to the viewing axes of the cameras.

It is also possible to dispense with the side view cameras 20, and rely solely on the rear view camera 22 to determine when and in what position object 12 impacts surface 16. For example, the images of the object 12 as it approaches the surface 16 may be indicative of the object 12 and a shadow of the object 12 on the surface 16, and the processor 14 may determine when and in what position the object 12 impacts the surface 16 at a time when the object 12 and the shadow of the object 12 on the surface 16 converge within the image. As another example. the processor 16 may determine when and in what position the object 12 impacts the surface 16 at a time when a vertical path of travel of the object 12 undergoes a dramatic change, thereby indicating that the object 12 has impacted the surface 16.

The surface 16 may comprise any of numerous types of materials having any of numerous types of finishes. For example, the surface 16 may comprise a hard surface, such as a wall, or the surface 16 may comprise a stretched fabric material, a cushioned material, etc., which may be desirable, for example, to slow the object 12 after impact or to reduce the likelihood of injury if a user of system 10 collides with surface 16. However, the surface 16 is preferably made of a material that is conducive to display of projected images thereon.

Projector 18 may be of substantially any type, and is preferably able to project streaming video images on surface 16. Processor 14 may take the form of, for example, a personal computer having software running thereon for determining, based at least on part upon the image signals received from the cameras, when and in what position the object 12 impacts the surface 16, as well as for generating, based at least in part upon the determination of when and in what position the object 12 impacts the surface 16, feedback signals indicative of feedback to be provided to a user. The feedback signals may be used to cause projector 18 to display appropriate images on surface 16 and/or to cause one or more speakers 24 to play appropriate audio feedback.

System 10 may be used to play a variety of games which will encourage a user to become engaged and desire to keep playing. The particular games may be selected based upon the age, gender, skill level, or any other characteristics of the user. For example, system 10 may be used to play a target game, in which a user throws a ball to hit displayed targets at various locations and provide appropriate software-based feedback, to play a tile game in which the user must hit various positions on the surface with a ball or the like in order to fill the surface with tiles, to play a break-down-the-wall game in which the user must hit various positions on the surface with a ball or the like in order to knock down "bricks" in the wall, to play a game of catch with a "virtual partner" who reacts appropriately depending upon where a ball or the like hits the surface, to play a dodge-ball type game where the user attempts to hit a virtual person or object on the surface who is attempting to avoid being hit, etc. The options for games where the timing and location of an object impacting a surface are virtually limitless.

Also virtually limitless are the options for the video and audio feedback provided to the user by system 10. For example, the feedback may comprise a sprite or animation reacting to where and when the object strikes the surface by "moving" toward or away from the position of impact and/or making sounds in response thereto, a video clip playing across the entire surface, a video clip being played on the surface in the vicinity of where the object impacted the surface, a displayed score being changed, a new level of the game being displayed, etc. It is desired that the feedback, whatever its form, be designed to engage the player, and cause him/her to want to continue playing.

Figure 3:
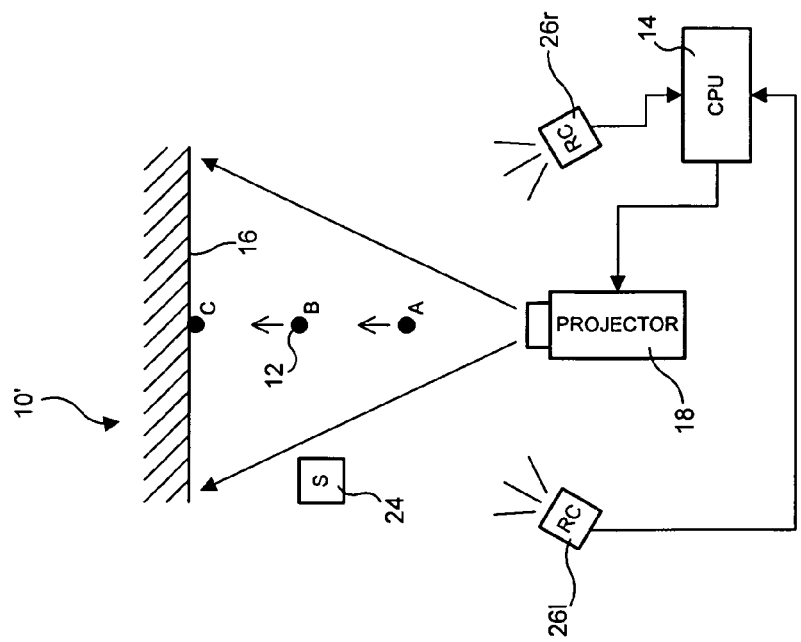
FIG. 3 is a schematic top view of the system for promoting physical activity of FIG. 1 with modified camera placement.

Referring now to FIG. 3, system 10' for promoting physical activity in accordance with the present invention is shown. System 10' is similar in many respects to system 10, with the exception that cameras 20, 22 are replaced with two rear view cameras 26l, 26r positioned with viewing axes thereof arranged at oblique angles with respect to the surface 16, which cameras 26l, 26r are used to capture images of the object 12 as it approaches and impacts the surface 16. Using this arrangement of cameras, the processor 14 employs a "stereo vision approach" to determine when and in what position the object 12 impacts the surface 16 based at least in part upon a relationship between the images captured by the rear view cameras 26l, 26r. More specifically, the processor 14 determines that the object 12 has impacted the surface 16 when the object 12 is positioned in substantially identical locations within images captured by the rear view cameras 26l, 26r at any given time.

Since the rear view cameras 26l, 26r are positioned with viewing axes thereof arranged at oblique angles with respect to the surface 16, the cameras will "see" a generally quadrilateral or trapezoidal (depending upon the particular placement of the cameras) image of the surface 16 with the object 12 being located within this quadrilateral or trapezoidal image as it approaches and contacts the surface 16. The processor has executing thereon an algorithm that calibrates and translates the (u,v) coordinates of the quadrilateral or trapezoidal image captured by cameras 26l, 26r into standard two-dimensional Cartesian (x,y) coordinates. This may be done by locating the corners and/or edges of the surface 16 and/or by providing calibration markings the surface 16 and then by using any of the numerous calibrating/translating algorithms that are known in the art for this purpose, or any calibrating/translating algorithms later developed. The calibration process may be performed during a setup interval before the game is played, such that the calibration markings need only be projected during this time. Alternately, the calibration markings may be permanently marked or periodically projected on the surface 16 and calibration may be performed continuously or periodically. Since such algorithms are well-known in the art, they are not described herein in detail.

Figure 4A:
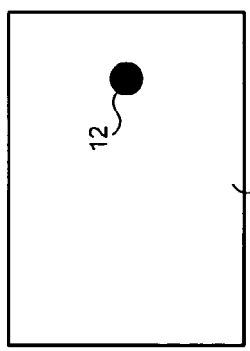
FIGS. 4A-4C illustrate the images captured by the cameras of the system for promoting physical activity of FIG. 3 for various positions of the object being tracked.
Figure 4A:
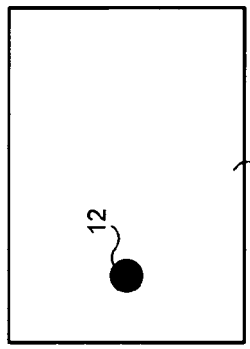
Figure 4B:
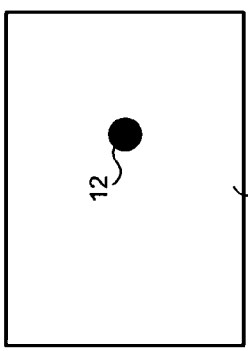
Figure 4B:
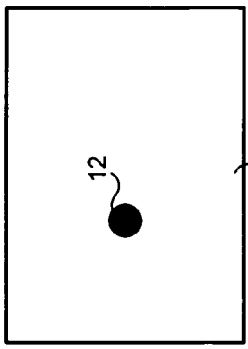
Figure 4C:
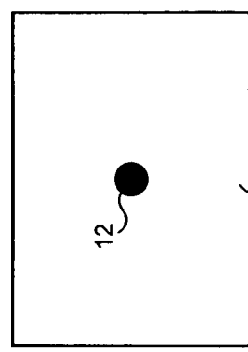
Figure 4C:
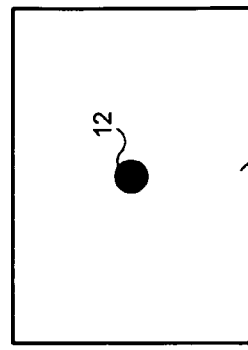

Examples of the images captured by cameras 26l, 26r after they have been calibrated/translated into standard two-dimensional Cartesian (x,y) coordinates are illustrated in FIGS. 4A through 4C. FIG. 4A illustrates the images 28l, 28r captured by rear view cameras 26l, 26r, respectively, when the object 12 is in position A shown in FIG. 3. As can be seen in FIG. 3, the object 12 when in position A is located relatively far away from surface 16, and consequently, objects 12 in images 28l, 28r of FIG. 4A are located relatively far away from each other if the two images 28l, 28r are superimposed. FIG. 4B illustrates the images 28l, 28r captured by rear view cameras 26l, 26r, respectively, when the object 12 is in position B shown in FIG. 3. As can be seen in FIG. 3, the object 12 when in position B is now located closer to surface 16, and consequently, objects 12 in images 28l, 28r of FIG. 4B are now located closer together if the two images 28l, 28r are superimposed. FIG. 4C illustrates the images 28l, 28r captured by rear view cameras 26l, 26r, respectively, when the object 12 is in position C shown in FIG. 3. As can be seen in FIG. 3, the object 12 when in position C is now impacting surface 16, and consequently, objects 12 in images 28l, 28r of FIG. 4C are now located in substantially the same position if the two images 28l, 28r are superimposed. Thus, when the processor 14 "sees" the images 28l, 28r as shown in FIG. 4C, a determination is made that the object 12 is impacting the surface 16.

It should be understood that although two rear view cameras 26l, 26r are shown and described in FIG. 3, more than two rear view cameras may be employed. The number of rear view cameras desired, for example, may be dependent upon how wide of an area each camera is capable of viewing, the size of the surface 16 upon which impacts are to be measured, and how far from the surface 16 the cameras are located. In some circumstances, providing a larger number of rear view cameras may also allow for the location where of the object 12 impacts the surface 16 to be more precisely determined, particularly when the rear view cameras have a relatively low video capture speed and/or when the object 12 strikes the surface 16 at a relatively high velocity. So long as at least two rear view cameras are positioned to generate images of all portions of surface 16, the "stereo vision approach" may be employed. Of course, more than two cameras (for example, four cameras) may be employed to generate images of the same portion of surface 16, in which case, the four images generated thereby could be evaluated by the processor 14 to determine when and in what position an impact with the surface has occurred. Alternately, several pairs of cameras could be employed to separately generate images of several different portions of the surface 16, in which case, the processor 14 could evaluate only those images in which the object 12 appears in order to evaluate when and in what position an impact with the surface has occurred.

Figure 5:
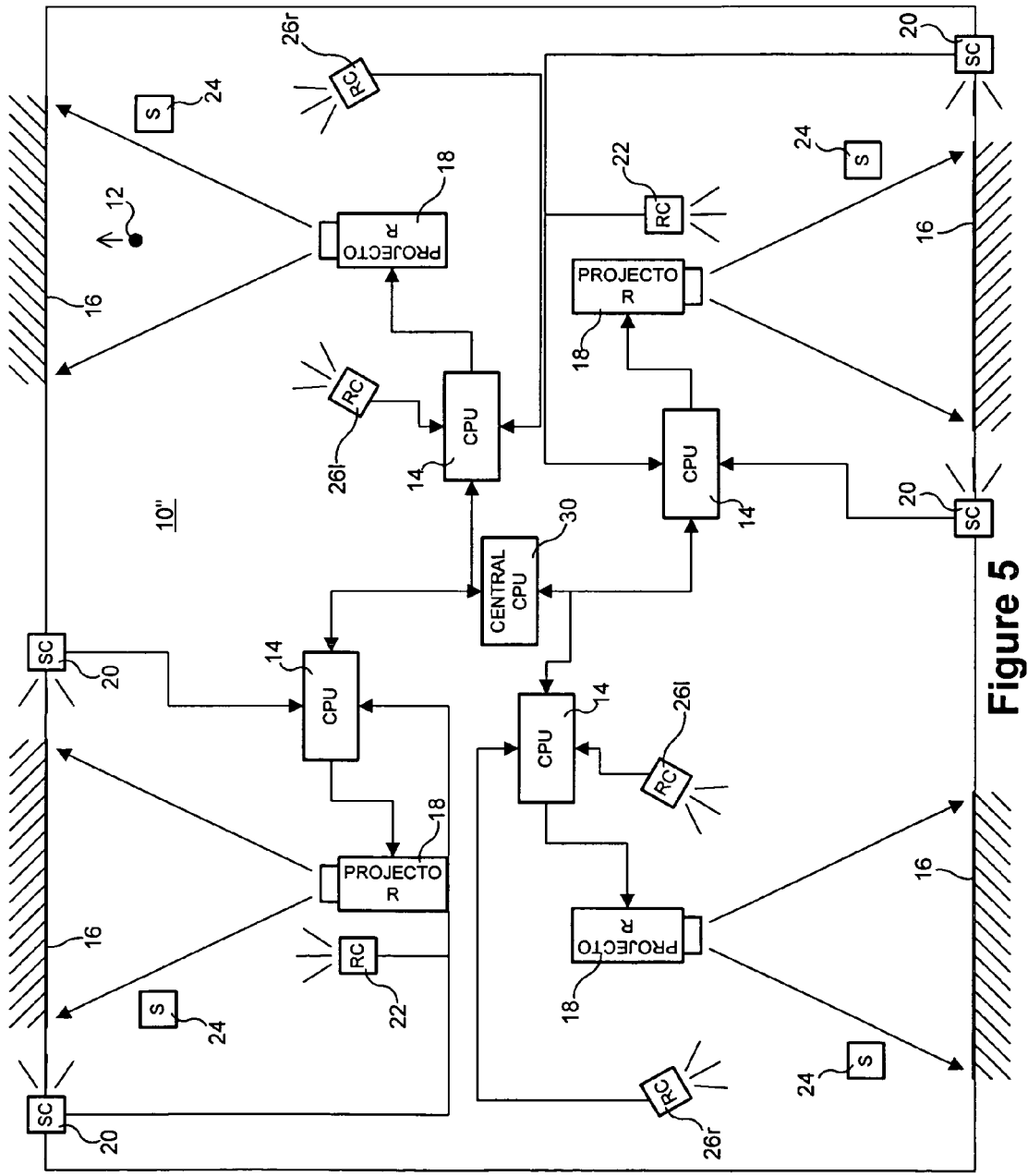
FIG. 5 is a schematic top view of a system for promoting physical activity including a plurality of the object tracking stations as illustrated in FIGS. 1 through 3.

Referring now to FIG. 5, system 10" for promoting physical activity in accordance with the present invention is shown. System 10" includes a plurality of surfaces 16 and a plurality of processors 14, each of the plurality of processors 14 being associated with one of the plurality of surfaces 16, and each of the plurality of processors 16 receiving input signals from a plurality of sensors and determining, based at least on part upon the input signals, when and in what position an object 12 impacts one of the plurality of surfaces 16.

The plurality of sensors may take the form of at least two cameras which capture images of the object, and the input signals may take the form of image signals generated by the cameras indicative of the captured images. For example, the sensors may take the form of one or more side view cameras 20 positioned with a viewing axis thereof substantially parallel to the surface 16 with which it is associated, the side view camera capturing images illustrative of when the object 12 impacts the surface 16 with which it is associated, and one or more rear view cameras 22 capturing images illustrative of where on the surface 16 with which it is associated the object 12 impacts, in a manner similar to that described above with respect to FIGS. 1 and 2. The sensors may also take the form of at least two rear view cameras 26l, 26r positioned with viewing axes thereof arranged at oblique angles with respect to the surface 16 with which they are associated, the rear view cameras 26l, 26r capturing images of the object 12 as it approaches and impacts the surface 16 with which the rear view cameras 26l, 26r are associated, with the processor 14 determining when and in what position the object 12 impacts the surface 16 with which the rear view cameras 26l, 26r are associated in a manner similar to that described above with respect to FIGS. 3 through 4C. Other types of sensors and schemes for determining when and in what position the object 12 impacts the surface 16 may also be employed. Also, as shown in FIG. 5, different types of sensors and schemes for determining when and in what position the object 12 impacts the surface 16 may be employed for different of the plurality of surfaces 16.

The system 10" also includes a plurality of projectors 18, each of the plurality of projectors 18 being in communication with one of the plurality of processors 14, the plurality of projectors 18 receiving the feedback signals and, based at least in part upon the feedback signals, displaying visual feedback to the user on the plurality of surfaces 16. The system may also include a plurality of speakers 24, each of the plurality of speakers 24 being in communication with one of the plurality of processors 14, the plurality of speakers 24 receiving the feedback signals and, based at least in part upon the feedback signals, playing audio feedback to the user.

System 10" may also include a central controller 30 in communication with the plurality of processors 14, the central controller 30 causing the plurality of processors 14 to work cooperatively. For example, by providing a plurality of processors 14 working cooperatively to detect impacts on a plurality of surfaces 16 using a plurality of sensors (such as cameras 20, 22, 26l, 26r) and controlling a plurality of projectors 18 and speakers 24, any one of the games described above, in addition to many other games, could be played in an "interactive arena" rather than being limited to a single surface 16. As merely one example, in a game of "virtual dodge ball", the target may be caused to "run" around the entire "interactive arena" across several of the plurality of surfaces 16 rather than being confined to a single surface 16, thereby requiring that the player move around the arena attempting to "hit" the target in order to further promote physical activity. Another benefit/use of system 10" is that multiple players can cooperate (collective goals/scoring) or compete on different displays 16, coordinated by the central controller 30.

The present invention, therefore, provides a system for promoting physical activity which aids participants in learning and mastering motor skills, which promotes repetition with ongoing, immediate, and engaging feedback, which is relatively not costly to produce and maintain, which accurately senses the impact of an object with a surface, which is not prone to failure and/or miscalibration, and which can be used in situations where an object being tracked is not struck with a bat, club, etc.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for promoting physical activity comprising:
at least two cameras which capture images of an object as it approaches and impacts a surface and generate image signals indicative of the captured images, at least one of said at least two cameras comprising a side view camera positioned with a viewing axis thereof substantially parallel to the surface, the side view camera capturing images illustrative of when the object impacts the surface, and at least one of said at least two cameras comprising a rear view camera positioned with a viewing axis thereof perpendicular to the surface or at an oblique angle with respect to the surface and such that the viewing axis of the rear view camera points toward the surface, the rear view camera capturing images of the surface itself and illustrative of where on the surface the object impacts;
a processor in communication with the cameras, said processor receiving the image signals from the cameras and determining a specific point in time when the object impacts the surface based at least in part upon the images captured by the side view camera and without regard to the images captured by the rear view camera, and in what position the object impacts the surface based at least in part upon the images captured by the rear view camera at the specific point in time and without regard to the images captured by the side view camera, said processor generating, based at least in part upon the determination of when and in what position the object impacts the surface, feedback signals indicative of feedback to be provided to a user of said system; and
a projector in communication with said processor, said projector receiving the feedback signals and, based at least in part upon the feedback signals, displaying visual feedback to the user on the surface.

2. The system of claim 1 wherein said at least two cameras comprises at least three cameras, and wherein two of the cameras comprise side view cameras positioned with viewing axes thereof substantially parallel to the surface, the side view cameras capturing images illustrative of when the object impacts the surface.

3. The system of claim 1 further comprising a speaker in communication with said processor, said speaker receiving the feedback signals and, based at least in part upon the feedback signals, playing audio feedback to the user.

4. The system of claim 1 wherein said projector generates and displays visual cues on the surface which encourage the user to throw the object toward particular areas of the surface.

5. A system for promoting physical activity comprising:
a side view camera which captures images of an object as it approaches and impacts a surface and generates image signals indicative of the captured images, said side view camera positioned with a viewing axis thereof substantially parallel to a surface, and capturing images illustrative of when the object impacts the surface;
a rear view camera positioned with a viewing axis thereof perpendicular to the surface or at an oblique angle with respect to the surface and such that the viewing axis of the rear view camera points toward the surface, said rear view camera capturing images of the surface itself and illustrative of where on the surface the object impacts; and a processor in communication with said side view camera and said rear view camera, said processor receiving the image signals from said side view camera and said rear view camera and determining a specific point in time when the object impacts the surface based at least in part upon the images captured by the side view camera and without regard to the images captured by the rear view camera, and in what position the object impacts the surface based at least in part upon the images captured by the rear view camera at the specific point in time and without regard to the images captured by the side view camera.

6. The system of claim 5 wherein said processor generates, based at least in part upon the determination of when and in what position the object impacts the surface, feedback signals indicative of feedback to be provided to a user of said system.

7. The system of claim 6 further comprising a projector in communication with said processor, said projector receiving the feedback signals and, based at least in part upon the feedback signals, displaying visual feedback to the user on the surface.

8. The system of claim 6 further comprising a speaker in communication with said processor, said speaker receiving the feedback signals and, based at least in part upon the feedback signals, playing audio feedback to the user.

9. The system of claim 6 wherein said side view camera comprises two side view cameras which capture images of the object and generate image signals indicative of the captured images, said side view cameras positioned with viewing axes thereof substantially parallel to the surface, and capturing images illustrative of when the object impacts the surface.

10. The system of claim 5 further comprising a projector in communication with said processor, said projector generating and displaying visual cues on the surface which encourage the user to throw the object toward particular areas of the surface.

11. A system for promoting physical activity comprising:
at least two rear view cameras positioned with viewing axes thereof arranged at oblique angles with respect to a surface, the rear view cameras capturing images of an object as it approaches and impacts the surface and generating image signals indicative of the captured images;
a processor in communication with said rear view cameras, said processor receiving the image signals from said rear view cameras and determining when and in what position the object impacts the surface based at least in part upon a relationship between the images captured by the rear view cameras; and
wherein said images are indicative of the object and a shadow of the object on said surface, and wherein said processor determines when and in what position the object impacts said surface at a time when the object and the shadow of the object converge within the image.

12. The system of claim 11 wherein said processor generates, based at least in part upon the determination of when and in what position the object impacts the surface, feedback signals indicative of feedback to be provided to a user of said system.

13. The system of claim 12 further comprising a projector in communication with said processor, said projector receiving the feedback signals and, based at least in part upon the feedback signals, displaying visual feedback to the user on the surface.

14. The system of claim 13 wherein said projector generates and displays visual cues on the surface which encourage the user to throw the object toward particular areas of the surface.

15. The system of claim 12 further comprising a speaker in communication with said processor, said speaker receiving the feedback signals and, based at least in part upon the feedback signals, playing audio feedback to the user.

16. A system for promoting physical activity comprising:
a plurality of surfaces;
a plurality of processors, each of the plurality of processors being associated with one of the plurality of surfaces, and each of the plurality of processors receiving input signals from a plurality of sensors and determining, based at least in part upon the input signals, when and in what position an object impacts one of the plurality of surfaces, said processor generating, based at least in part upon the determination of when and in what position the object impacts one of the plurality of surfaces, feedback signals indicative of feedback to be provided to a user of said system;
a plurality of projectors, each of the plurality of projectors being in communication with one of said plurality of processors, said plurality of projectors receiving the feedback signals and, based at least in part upon the feedback signals, displaying visual feedback to the user on the plurality of surfaces;
wherein the plurality of sensors comprise at least two cameras which capture images of the object as it approaches and impacts a surface and wherein the input signals comprise image signals generated by the cameras indicative of the captured images;
wherein at least one of the at least two cameras comprises a side view camera positioned with a viewing axis thereof substantially parallel to the surface with which it is associated, the side view camera capturing images illustrative of when the object impacts the surface with which it is associated;
wherein at least one of the at least two cameras comprises a rear view camera positioned with a viewing axis thereof perpendicular to the surface or at an oblique angle with respect to the surface and such that the viewing axis of the rear view camera points toward the surface, said rear view camera capturing images of the surface with which it is associated itself and illustrative of where on the surface with which it is associated the object impacts; and
wherein the determination of when the object impacts one of the plurality of surfaces comprises determining a specific point in time when the object impacts one of the plurality of surfaces based at least in part upon the images captured by the side view camera and without regard to the images captured by the rear view camera, and the determination of in what position the object impacts one of the plurality of surfaces comprises determining in what position the object impacts one of the plurality of surfaces based at least in part upon the images captured by the rear view camera at the specific point in time and without regard to the images captured by the side view camera.

17. The system of claim 16 further comprising a central controller in communication with said plurality of processors, said central controller causing said plurality of processors to work cooperatively.

18. The system of claim 16 wherein said plurality of projectors generate and display visual cues on the plurality of surfaces which encourage the user to throw the object toward particular areas of the plurality of surfaces.

19. A system for promoting physical activity comprising:

at least one rear view camera which captures images of an object as it approaches a surface and generates image signals indicative of the captured images;

a processor in communication with the camera, said processor receiving the image signals from the camera and determining, based at least in part upon the image signals, when and in what position the object impacts a surface, said processor generating, based at least in part upon the determination of when and in what position the object impacts the surface, feedback signals indicative of feedback to be provided to a user of said system; and a projector in communication with said processor, said projector receiving the feedback signals and, based at least in part upon the feedback signals, displaying visual feedback to the user on the surface;

wherein the images of an object as it approaches the surface are indicative of the object and a shadow of the object on the surface, and wherein said processor determines when and in what position the object impacts the surface at a time when the object and the shadow of the object on the surface converge within the image.

* * * * *